Figures 1, 2:
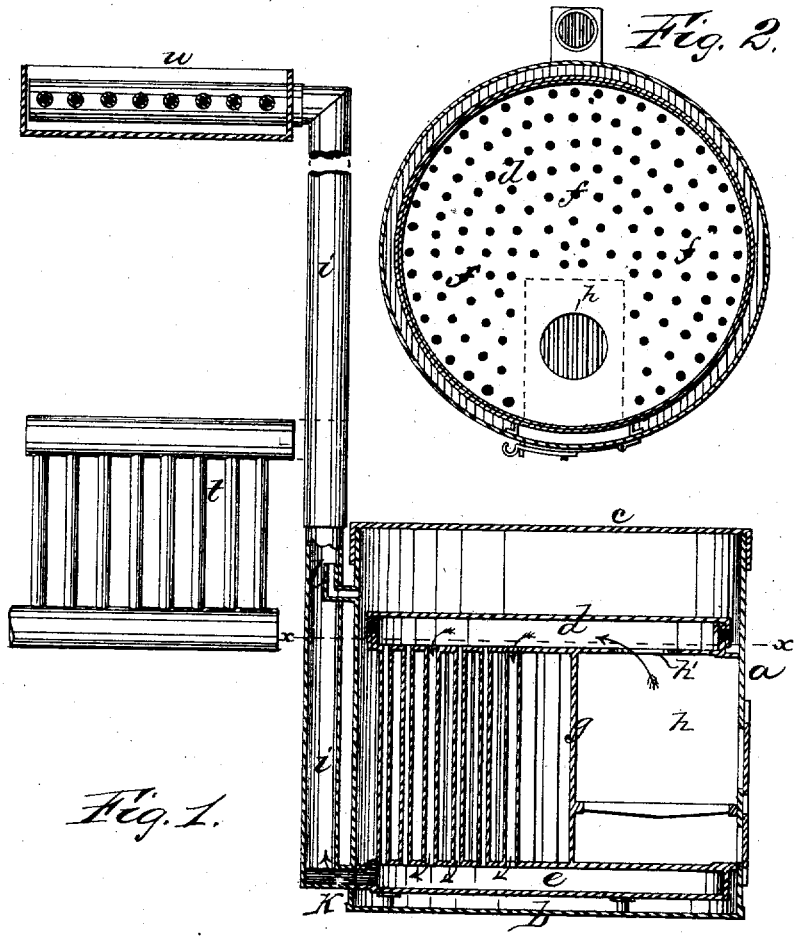

J. E. CULVER.

STEAM GENERATOR.

No. 10,241. Reissued Nov. 14, 1882.

Witnesses.

W. Colloma Brookes

R. M. Supple

Inventor.

Joseph Edwin Culver

By J. Richards & Co.

His Attorneys.

N. PETERS, Photo-Lithographer, Washington, D. C.

UNITED STATES PATENT OFFICE.

JOSEPH E. CULVER, OF JERSEY CITY, NEW JERSEY.

STEAM-GENERATOR.

SPECIFICATION forming part of Reissued Letters Patent No. 10,241, dated November 14, 1882.

Original No. 236,558, dated January 11, 1881. Application for reissue filed August 28, 1882.

*To all whom it may concern:*

Be it known that I, JOSEPH EDWIN CULVER, M. D., of Jersey City, in the county of Hudson and State of New Jersey, have invented new and useful Improvements in Apparatus for Generating Steam and for Heating Fluids or Fluent Bodies and other Similar Purposes, of which the following is a specification.

My invention relates to improvements in apparatus for generating steam and for heating fluids or fluent bodies and other similar purposes.

One of the objects of my invention is to avoid the external heating of the boiler, and also to obtain a thermostatic balance in the flues or passages through the boiler by connecting the upper and lower ends of such flues or passages to upper and lower chambers, as hereinafter more fully explained. By this peculiar arrangement and construction of the flues or passages and chambers the hot products of combustion enter the device at the upper part and pass downward, and are discharged at the lower part, while the water or fluid being heated enters at the bottom of the external compartment or receiver and passes away at the top. One of the great advantages of this arrangement is that when generating steam, if sufficient water is supplied to the device, the water will not boil between the tubes and beneath the lower flue-chamber, and all the steam will be generated and collected above the top plate of the upper flue-chamber.

According to my invention I inclose within a shell, constructed of any preferred shape, and of boiler-iron, cast or sheet metal, or any other suitable material, a structure, preferably metallic, consisting of an upper and lower chamber, preferably having the form of hollow disks, and of a series of tubes connected together in such manner as to communicate with each other through the medium of such upper and lower chambers, provision being made that no leakage shall exist between the interior of the inclosed structure and the space included in the shell. The area of the inclosed tubular compartment or structure is sufficiently less than that of the shell to allow free circulation of a fluent body between them, and for the same purpose, however numerous and closely distributed the tubes may be, they are left out of actual contact.

Hitherto in steam-generators the gaseous products of combustion escaping to the smoke-stack have had a much higher temperature than the steam in the boiler, thus involving a vast and unnecessary waste of heat force. By my improvements this waste is avoided.

In my improved generator the boiler may be constructed of sheet metal or boiler-iron, the strength of which must be adapted to withstand the pressure to which it is to be subjected. The flues may be constructed of sheet-metal boiler-tubes or cast-iron, or of any suitable material. The furnace may be of ordinary construction.

When my improved generator is to be used solely for heating purposes, or when the tension of the steam in the boiler is to be carried only a few degrees above atmospheric pressure, the fire-box may advantageously be constructed within the water-space of the boiler and connected with an upper flue-chamber, from which flue-tubes pass to a smoke-chamber in the lower part of the water-space; but when it is intended to furnish motive power, and the steam-pressure within the boiler is to be raised to two or more atmospheres, then I prefer to have the fire-box constructed outside the boiler-shell and to be connected with a system of intercommunicating flue-tubes arranged within the water space of the boiler, so that the smoke shall traverse them from above downward. If the flues intercommunicate freely within the water-space at the bottom of the boiler only, the desired result can be but imperfectly obtained; but if, besides these junctions beneath, free intercommunication exists among all the uppermost parts of the flues also, a perfect working will be assured. Nevertheless, the intercommunications may be yet more numerous and distributed throughout the entire system of flues from top to bottom. I have estimated from some experiments that the total capacity of the submerged flues in my generator should equal about one-third of the water-space, in order that the smoke and steam may emerge from the boiler at a common temperature when the grate-surface is about one-third the customary proportions and the draft moderate. When a considerable depth of the water-space is called for, an upright cylindrical boiler is the best; but the shape of the boiler may be determined by other requirements. However, the longer and more numerous the flue-tubes, and the greater the total capacity of the flues relatively to that of the water-space, the more effectually will the water be heated and the smoke cooled, the consumption of fuel remaining the same.

Accordingly as may be preferred for especial purposes, or whensoever it is sought merely to illustrate in practice the novel principle made use of in the construction of my improved generator, the flues may consist of tubes alone or of chambers alone, or of any suitable combination of chambers and tubes, provided, always, that they be arranged within the water-space of the boiler below the water-level; provided, also, that they do freely intercommunicate one with another at the bottom within the water-space; provided, furthermore, that they do so connect with the furnace and smoke-stack that the smoke shall traverse them from above downward; and provided, moreover, that the descending smoke in every flue and in every part or section thereof is left free to descend according as it is cooled, or to maintain a higher level according as it retains its heat and rarefaction. Thus the continued cooling of the smoke in the flues and its increasing gravity serve to accelerate its descent, while throughout the breadth and depth of the water-space the smoke in all the flues maintains at the same level a uniform temperature—an equilibrium not liable to be disturbed by variable drafts. The water boils at the surface, and steam does not bubble up from the lower part of the boiler. The temperature of the water decreases from above downward, but it is uniform throughout any given horizontal plane. At all times the hottest stratum of water is opposed to the hottest flues and the coolest stratum to the coolest flues. The cooled smoke in the lowermost flues is carried off by one large flue, or more, continued through the boiler-shell for this purpose. Into this discharge-flue, just outside the boiler, a two-way cock or valve of ample size is inserted, through which the discharge-flue connects, at option, with a chimney to carry away the unused smoke, or with a smoke-pipe, termed a "mixing-pipe," that is also connected with the steam-space by a pipe furnished with a cut-off, so that the gaseous products of combustion and the steam can be carried off together under pressure. This mixture may be used to drive a suitable motor, for heating purposes, for evaporating liquids, for extinguishing fires, and for other uses.

In the accompanying drawings, forming part of this specification, Figure 1 is a central vertical section of the generator and furnace. Fig. 2 is a horizontal section of the same on line *x x* of Fig. 1.

Similar letters of reference indicate corresponding parts.

*a* is the side of the boiler-shell; *b*, the bottom, and *c* the top, which are formed of boiler-iron. Within the boiler are the upper and lower smoke-chambers, *d e*. These are made in the form of hollow circular disks, of a diameter somewhat less than the boiler, and are connected by vertical flue-tubes *f*, which are placed closely together, sufficient space being left between them for circulation of water. At the front part of the boiler the chambers *d e* are connected by partitions *g*, that form the fire-box *h*, which is provided with a grate. There are openings in the side *a* of the boiler to the fire-box *h*, above and below the grate, provided with doors. The lower smoke-chamber, *e*, is supported on short legs, so that the water has free access beneath it. The fire-box *h* and chamber *d* are connected by the flue or opening *h'*, which is of a sufficiently-small diameter, so that the passage of the products of combustion shall be slightly obstructed and deflected in their course, to the end that the gases arising from different parts of the fire shall be thoroughly intermingled and their temperatures equalized, at the same time securing a more perfect combustion.

*i* is the pipe for carrying off the steam and products of combustion. This connects by a pipe, *k*, with the smoke-chamber *e*, and by a pipe, *l*, with the steam-space of the boiler. A suitable valve will be provided in pipe *l* for regulating the flow of steam to pipe *i*. The steam entering pipe *i* becomes mixed with the heated gases, and at the same time the steam-jet tends to increase the upward draft. When the mixed steam and hot gases are employed to operate a motor of any kind an automatic check-valve in pipe *i*, below its junction with pipe *l*, becomes necessary to prevent reversal of the draft.

In operation, the products of combustion pass from the fire-box to the chamber *d*, and from thence, as they cool, they descend, by flues *f*, to chamber *e*. The flues and chambers are thus heated, and, by their large extent of heating-surface, rapidly and uniformly heat the water, the temperature decreasing from above downward. The products of combustion pass from chamber *e* to pipe *i*, and are conveyed away for use, mixed with more or less steam, as desired. The heated mixture may be conveyed to the cylinders of an engine, which may be worked as a high-pressure engine or may be provided with a suitable condenser. The mixture, at 212° to 215° Fahrenheit, may be used simply for purposes of heating and ventilation; or, in connection with evaporating-pans and conveyed by a suitable pipe, it may be employed to extinguish fires or to disinfect sick-rooms, hospitals, and ships, or as an antiseptic. A little sulphur thrown upon the fire in the furnace will add to the efficiency of the mixture as a disinfectant.

At *t*, I have shown a radiator consisting of horizontal and vertical tubes, which will be connected to pipe *i* and with a chimney for the final escape of the gases, thus utilizing the mixture of the heated gases and steam.

At *u* is an evaporating-pan containing tubes that connect with pipe *i*, so that the heat shall be equally distributed throughout the liquid in the pan.

The generator and furnace may also be used for other purposes than those named, and in all cases will give good results, compared with the amount of fuel consumed. The steam may be used under pressure or at atmospheric pressure only. If it be desirable to use steam under extraordinary pressure, it can be safely accomplished by nesting boilers built on this plan, one within another, whereby, for example, if the outer boiler can safely sustain a pressure of ten atmospheres, the inner boiler can, without being subjected to greater strain than the former, sustain a pressure of twenty atmospheres.

If it be desired to use the residual gases of combustion under pressures above that of the atmosphere, the furnace-doors must be closed tightly with strong fastenings, and the air-supply to the fire be kept up by a pressure-blower adapted to the purpose. A safety-valve will then be necessary in smoke-pipe *i*, as well as one for the boiler. When steam only is used, and combustion proceeds at atmospheric pressure, the chimney-valve will be kept open to convey away the unused smoke, and the mixing-pipe will not be employed.

Having thus described my invention, I claim as new and desire to secure by Letters Patent, in apparatus for generating steam-heating fluids or fluent bodies, or other similar purposes—

1. In a boiler, a system of intercommunicating flues and chambers having direct connection with the furnace and discharge-pipe, the flues and chambers being so arranged as to be entirely surrounded by water, and to admit only of the downward passage of the products of combustion, substantially as shown and described.

2. The combination, with a boiler or hot-air furnace, of a system of intercommunicating flues and chambers connected to said furnace by a suitable flue, said chambers and flues being wholly within the shell or jacket *a b c*, and so arranged that the flow of the products of combustion within them shall at all times be downward, substantially as and for the purpose described.

3. The combination, with the furnace, of an upper receiving-chamber and lower discharge-chamber, *e*, connecting pipes or flues *f*, said flues and chambers being so arranged as to be wholly within the water-space and to admit only of the downward passage of the products of combustion, and a mixing-pipe, *i*, substantially as and for the purpose described.

4. The combination, with the upper receiving-chamber, *d*, separated from the furnace, but connected thereto by a suitable delivery-flue, connecting pipes or flues *f*, and lower chamber, *e*, from which a suitable discharge pipe or flue passes laterally through the steam-jacket and externally of the boiler-shell into the mixing-pipe *i*, of the water and steam jacket *a b c*, substantially as and for the purpose set forth.

5. The combination, with a furnace, of an upper receiving-chamber, *d*, and lower discharge-chamber, *e*, connecting pipes or flues *f*, said flues and chambers being wholly within the water-space, and a delivery or mixing pipe, *i*, of the water and steam jacket *a b c* and steam-pipe *l*, substantially as and for the purposes set forth..

6. The combination, in a boiler, of the shell *a* and fire-box *h* with an upper and lower smoke-chamber, *d e*, the upper chamber separated from the furnace, but connected thereto by a suitable delivery-flue, said chambers being connected by flues *f* and partition *g*, and arranged within the water-space so as to be surrounded on all sides by water, and to admit only of a downward passage of the products of combustion, substantially as shown, and for the purpose specified.

7. The combination, with a boiler provided with a system of intercommunicating flues and chambers, having direct connection with the furnace, and a discharge-pipe so arranged as to be entirely surrounded by water, and to admit of only a downward passage of the products of combustion, of a mixing-pipe, *i*, and smoke-pipe *k* and steam-pipe *l*, substantially as and for the purpose described.

8. The combination of the boiler and furnace with a system of intercommunicating flues distributed through the water-space from beneath the water-level to near the bottom of the boiler, the uppermost parts of which are connected through one or more openings with the combustion-space of the furnace, and the lowermost parts freely intercommunicate in a lower chamber wholly within the water-space, from which a common escape-flue passes out through the boiler-shell and is continuous with the smoke-stack, substantially as shown and described.

In witness whereof I have hereunto set my hand this 29th day of June, 1882.

JOSEPH EDWIN CULVER.

Witnesses:

WILLIAM H. RIBLET,
MORTIMER J. ENNIS.